US008366023B1

(12) United States Patent
Lin

(10) Patent No.: US 8,366,023 B1
(45) Date of Patent: Feb. 5, 2013

(54) HANDHELD SPRAYER STRUCTURE

(75) Inventor: Moses-B. Lin, Taipei (TW)

(73) Assignee: Ableman International Co., Ltd., Taipei (TW)

( * ) Notice: Subject to any disclaimer, the term of this patent is extended or adjusted under 35 U.S.C. 154(b) by 0 days.

(21) Appl. No.: 13/253,172

(22) Filed: Oct. 5, 2011

(51) Int. Cl.

| | |
|---|---|
| ***A01G 25/14*** | (2006.01) |
| ***B05B 9/01*** | (2006.01) |
| ***B65D 1/32*** | (2006.01) |

(52) U.S. Cl. ........ 239/375; 239/327; 239/526; 222/333; 222/372; 222/470

(58) Field of Classification Search .................. 239/302, 239/327, 375, 525, 526, 569; 222/251, 333, 222/334, 372, 470, 472, 473
See application file for complete search history.

(56) References Cited

U.S. PATENT DOCUMENTS

| | | | | |
|---|---|---|---|---|
| 4,705,191 | A * | 11/1987 | Itzel et al. | 222/80 |
| 4,832,230 | A * | 5/1989 | Janowitz | 222/80 |
| 5,397,034 | A * | 3/1995 | Wunsch | 222/333 |
| 6,502,766 | B1 * | 1/2003 | Streutker et al. | 239/332 |
| 7,219,848 | B2 * | 5/2007 | Sweeton | 239/102.2 |
| 2011/0048959 | A1 * | 3/2011 | Field | 205/334 |

* cited by examiner

*Primary Examiner* — Len Tran
*Assistant Examiner* — Justin Jonaitis
(74) *Attorney, Agent, or Firm* — Rosenberg, Klein & Lee

(57) ABSTRACT

The present invention discloses an improved handheld sprayer structure comprising an electric sprayer and a liquid container. The liquid container is filled with an appropriate amount of liquid, and this device is held by a hand, and a press button is pressed to trigger a start switch, such that a drive gear installed on a motor transmission shaft drives a plurality of wheels installed on a large gear to compress a hose to produce a suction, so as to suck the liquid in the liquid container upward, and spray the appropriate amount of liquid continuously and steadily from a spray head.

1 Claim, 8 Drawing Sheets

HANDHELD SPRAYER STRUCTURE

BACKGROUND OF THE INVENTION

1. Field of the Invention

The present invention relates to an improved handheld sprayer structure, and more particularly to the improved handheld sprayer structure comprising an electric sprayer and a liquid container, and the liquid container is filled with an appropriate amount of liquid, and this device is held by a hand, and a press button is pressed to trigger a start switch, such that a drive gear installed on a motor transmission shaft drives a plurality of wheels installed on a large gear to compress a hose to produce a suction, so as to suck the liquid in the liquid container upward, and spray the appropriate amount of liquid continuously and steadily from a spray head.

2. Description of the Related Art

As economy advances, life is improved. We place increasingly more emphasis on our physical and spiritual life, and a good living environment is one of the goals most people pursue. There are various different types of household and industrial handheld sprayers available in the market, and these handheld sprayers are generally sold with a liquid container, but most conventional handheld sprayers are operated by pressing to spray an appropriate amount of liquid contained in the liquid container. The actual operation of watering a potted plant or spraying a detergent to clean a place by a manual pressing method of these sprayers is limited by the user's physical strength to repeat the pressing operation and often cause an injury to the user's hand.

SUMMARY OF THE INVENTION

In view of the aforementioned drawbacks of the conventional sprayers, the inventor of the present invention based on years of experience in the related industry to conduct extensive researches and experiments, and finally developed an improved handheld sprayer structure to overcome the drawbacks of the prior art.

Therefore, it is a primary objective of the present invention to provide an improved handheld sprayer structure, comprising: an electric sprayer and a liquid container, wherein the liquid container is filled with an appropriate amount of liquid, and this device is held by a hand, and a press button is pressed to trigger a start switch, such that a drive gear installed on a motor transmission shaft drives a plurality of wheels installed on a large gear to compress a hose to produce a suction, so as to suck the liquid in the liquid container upward, and spray the appropriate amount of liquid continuously and steadily from a spray head.

With reference to FIGS. 1 to 7 for the components of the present invention, the liquid container (12) is filled with an appropriate amount of liquid. When a user holds this device by a palm and presses a press button (44) to push a press element (45) to move inwardly and upwardly to trigger a start switch (52), an LED lamp (51) projects a light beam to the front, and a drive gear (611) installed on a transmission shaft of a motor (61) drives a large gear (64) as shown in FIG. 8, such that a large gear (64) is turned in a direction as indicated by the arrowhead in the figure to drive and rotate the three wheels (65) axially coupled to the large gear (64), such that the wheels (65) are driven to compress the hose (66) continuously to perform a suction in order to draw the liquid stored in the liquid container (12) upward and spray an appropriate amount of liquid continuously and steadily out from the spray head (42).

DETAILED DESCRIPTION OF THE PREFERRED EMBODIMENTS

To make it easier for our examiner to understand the advantages and effect of the present invention, embodiments together with related drawings are provided for the detailed description and illustration of the present invention as follows.

Figure 1:
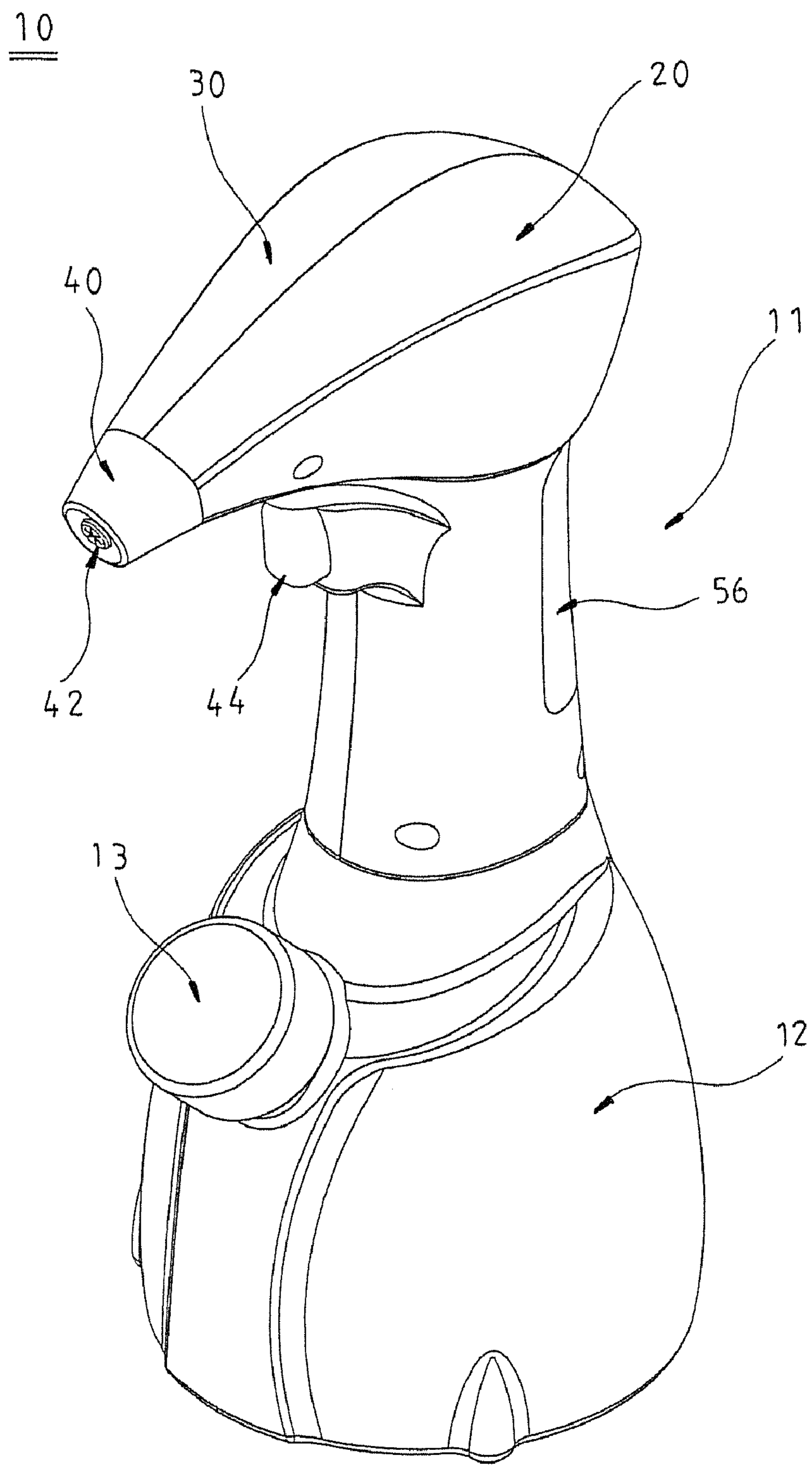
FIG. 1 is a perspective view of the present invention.
Figure 2:
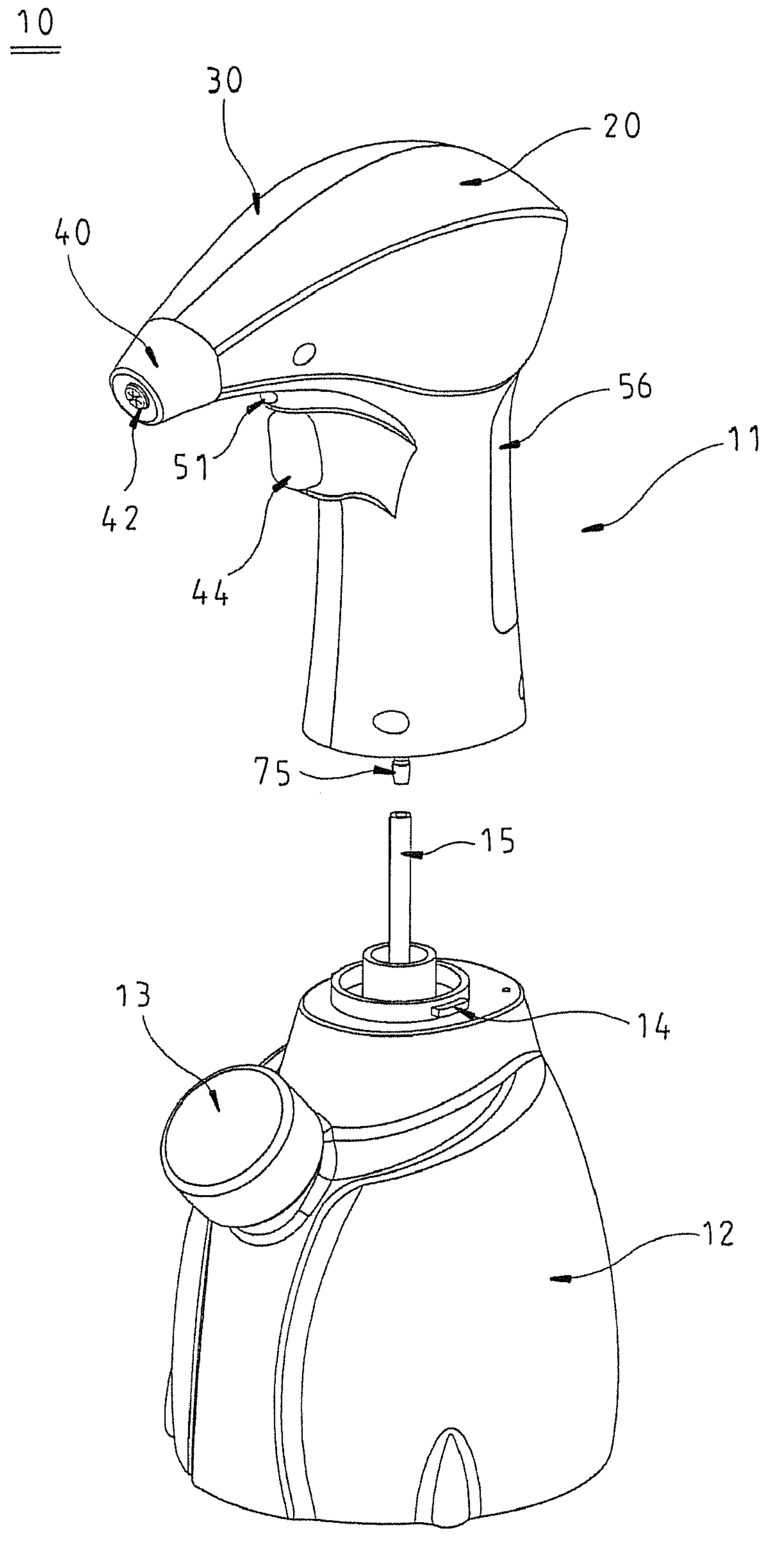
FIG. 2 is an exploded view of an electric sprayer (11) and a liquid container (12) of the present invention.

With reference to FIGS. 1 and 2 for an improved handheld sprayer structure of the present invention, a handheld sprayer (10) comprises an electric sprayer (11) and a liquid container (12).

The liquid container (12) is a hollow bottle having a cap (13) installed at a front side of the top of the liquid container (12), and the cap (13) can be opened for filling or refilling a liquid. A latch plate (14) is protruded from both sides of the top of the liquid container (12) separately, and a transmission tube (15) is passed through the center of the liquid container (12), and an end of the transmission tube (15) is extended into the bottom inside the liquid container (12), and the other end of the transmission tube (15) is extended to an appropriate length out from the top of the liquid container (12).

Figure 3:
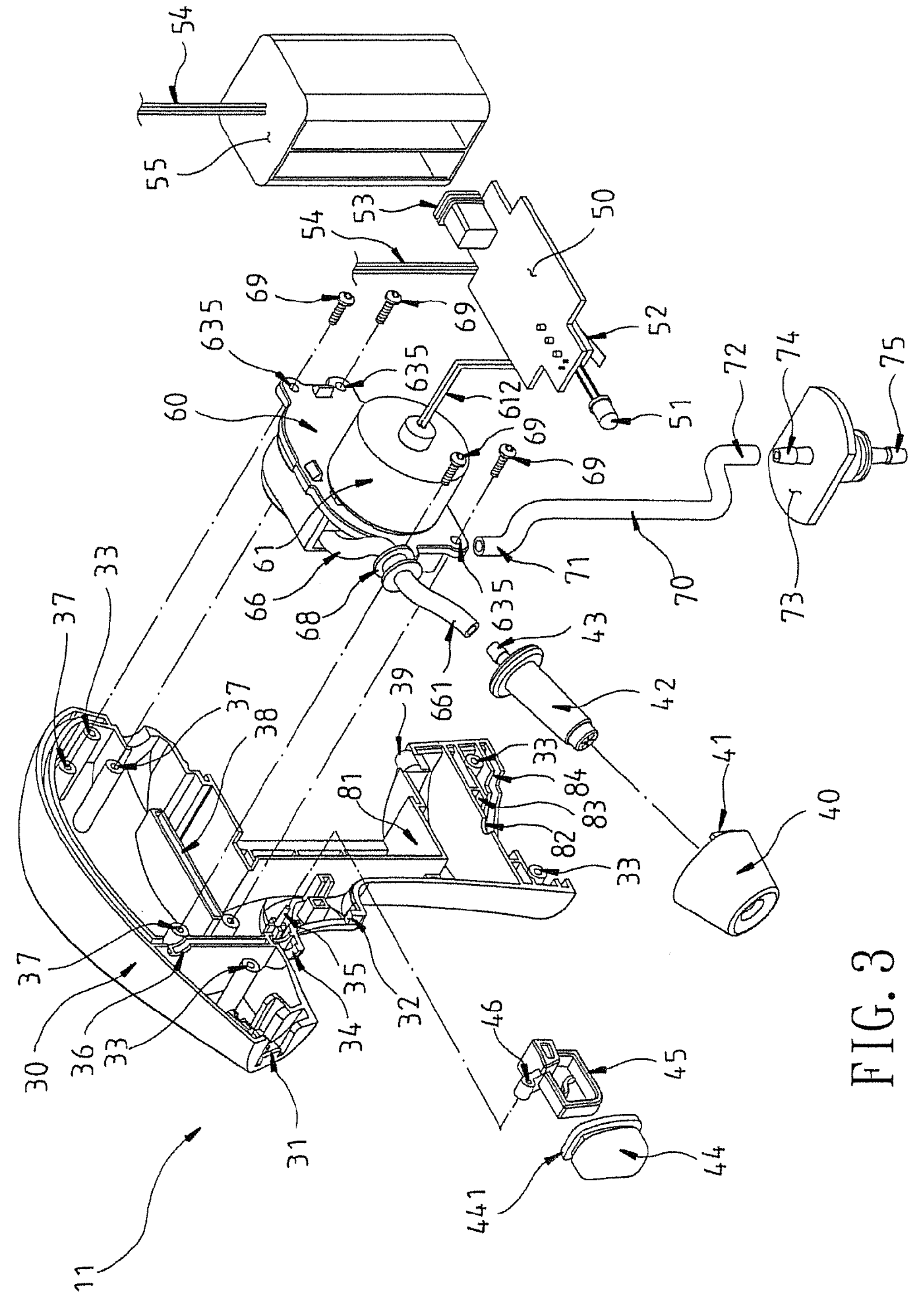
FIG. 3 is a partial exploded view of an electric sprayer (11) of the present invention.
Figure 4:
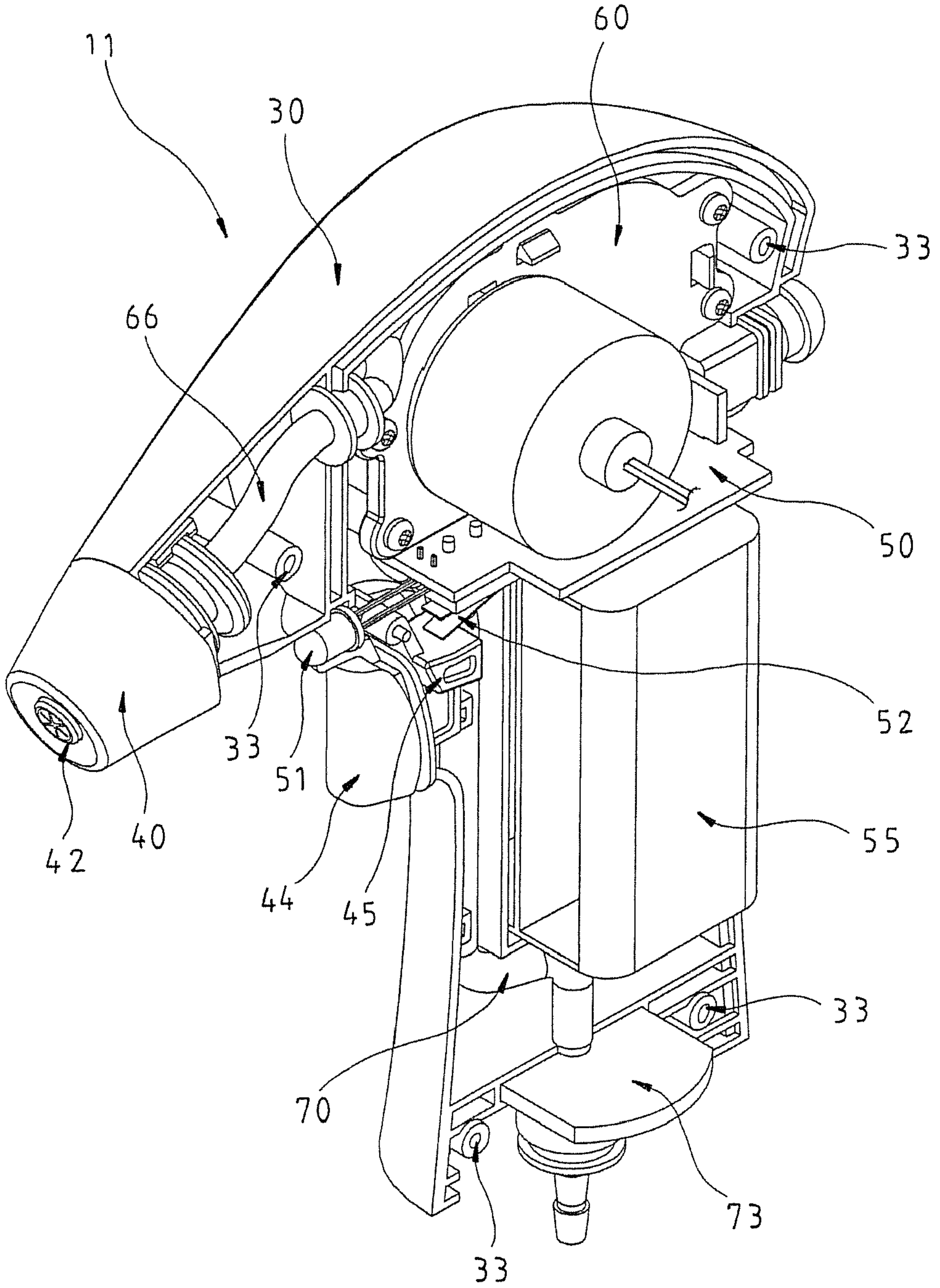
FIG. 4 is a partial perspective view of an electric sprayer (11) of the present invention.
Figure 5:
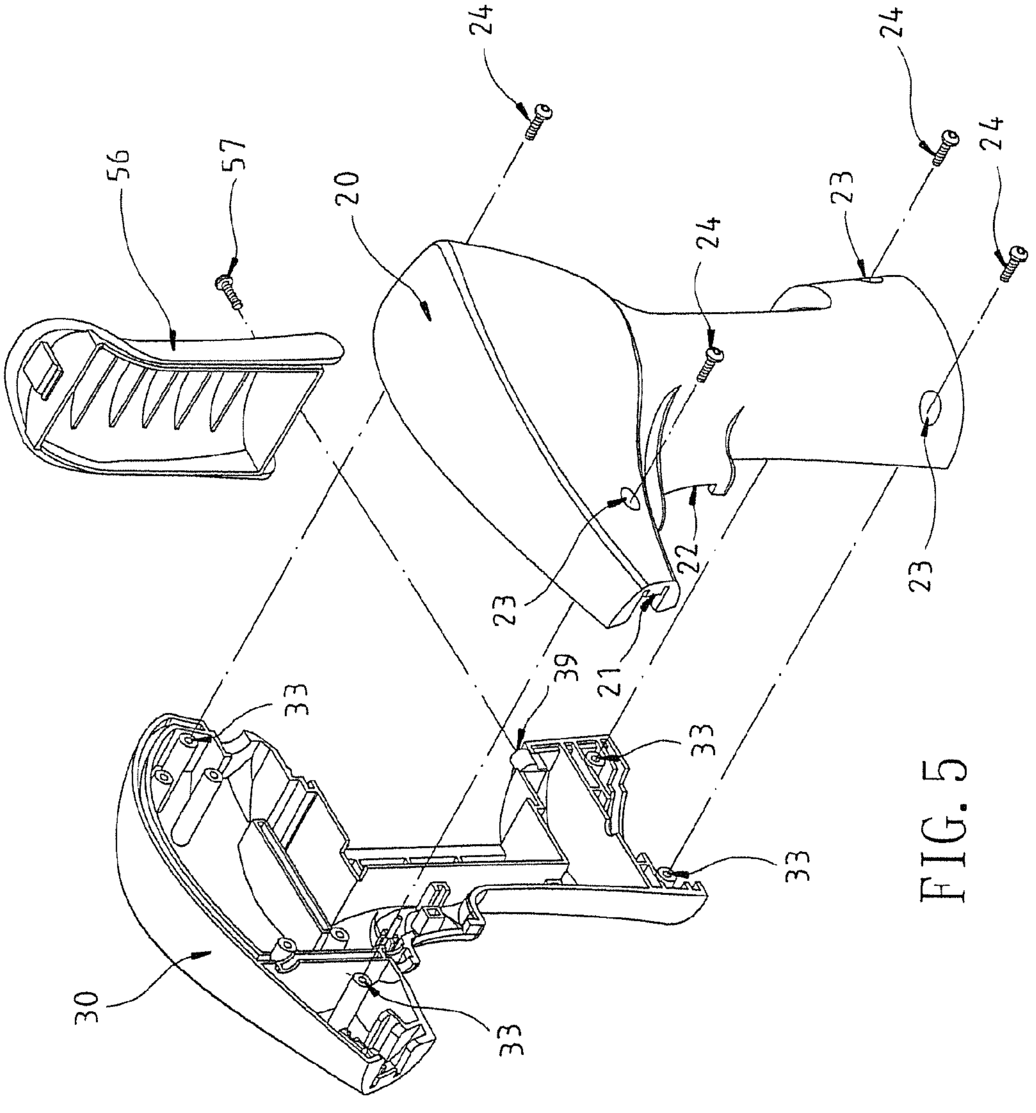
FIG. 5 is a schematic view of assembling and engaging a right casing (20), a left casing (30) and a battery cover (56) of an electric sprayer (11) of the present invention.

With reference to FIGS. 3 to 5, the electric sprayer (11) comprises a right casing (20), a left casing (30), a sleeve (40), a spray head (42), a press button (44), a press element (45), a control circuit device (50), a battery module (55), a liquid suction device (60), a transmission tube (70), a latch board (73) and a battery cover (56), The right casing (20) is a hollow-frame casing having a latch groove (21) formed at a front end of the top of the right casing (20), a rectangular groove hole (22) formed at a front end of the middle section of the right casing (20), and a plurality of screw holes (23) formed on an external frame of the right casing (20).

The left casing (30) is a hollow-frame casing comprising a latch groove (31) formed at a front end of the top of the left casing (30), a rectangular groove hole (32) formed at a front end of the middle section of the left casing (30), a plurality of screw holes (33) formed in the left casing (30), a semicircular hole (34) concavely formed at an upper edge of the rectangular groove hole (32), a protruding shaft (35) transversally protruded from an internal edge of the semicircular hole (34), and a semicircular arc groove hole (36) concavely formed inside the top edge of the left casing (30). The left casing (30) further comprises four screw holes (37) and a slender latch groove (38) formed on an internal side of the top of the left casing (30), a screw hole (39) formed at a lower edge of a rear side of the left casing (30), a containing space (81) formed at the center of a rear side of the left casing (30), a semicircular hole (82) formed at the center of the bottom edge of the left casing (30), a slender latch groove (83) formed at a lower edge of the semicircular hole (82), and a latch groove (84) formed at a position parallel to the bottom of the latch groove (83).

The sleeve (40) is a hollow conical casing having a convex latch plate (41) installed at the rear, and the sleeve (40) is installed into latch groove (31) at the front end of the top of the left casing (30) by the convex latch plate (41).

The spray head (42) is a hollow cylindrical shape having a protruding tube (43) installed at the rear, and the spray head (42) is passed through the center of the sleeve (40) and a front end of the spray head (42) is protruded to an appropriate length out from the sleeve (40).

The press button (44) is a hollow case made of a soft plastic material, and a latch flange (441) disposed around the periphery at the rear and into the rectangular groove hole (32) formed at the front end of the middle section of the left casing (30).

The press element (45) includes a shaft hole (46) transversally formed at an upper end of a middle section of the press element (45) and provided for installing into the protruding shaft (35) of the left casing (30), such that the press element (45) is axially coupled to the protruding shaft (35) in the left casing (30).

The control circuit device (50) is substantially in the shape of a plate and has an LED lamp (51) electrically coupled to a front end of the control circuit device (50), and the control circuit device (50) includes a start switch (52) installed at the bottom of the front end of the control circuit device (50) and a connecting element (53) installed at the top of a rear end of the control circuit device (50) and coupled for inputting an external power supply, and the control circuit device (50) is electrically coupled to a battery module (55) through a cable (54); the control circuit device (50) is inserted and fixed into a slender latch groove (38) on an internal side at the top of the left casing (30), and an LED lamp (51) is contained in a semicircular hole (34) of the left casing (30), and the battery module (55) is installed in a containing space (81) at the center of a rear side of the left casing (30).

Figure 6:
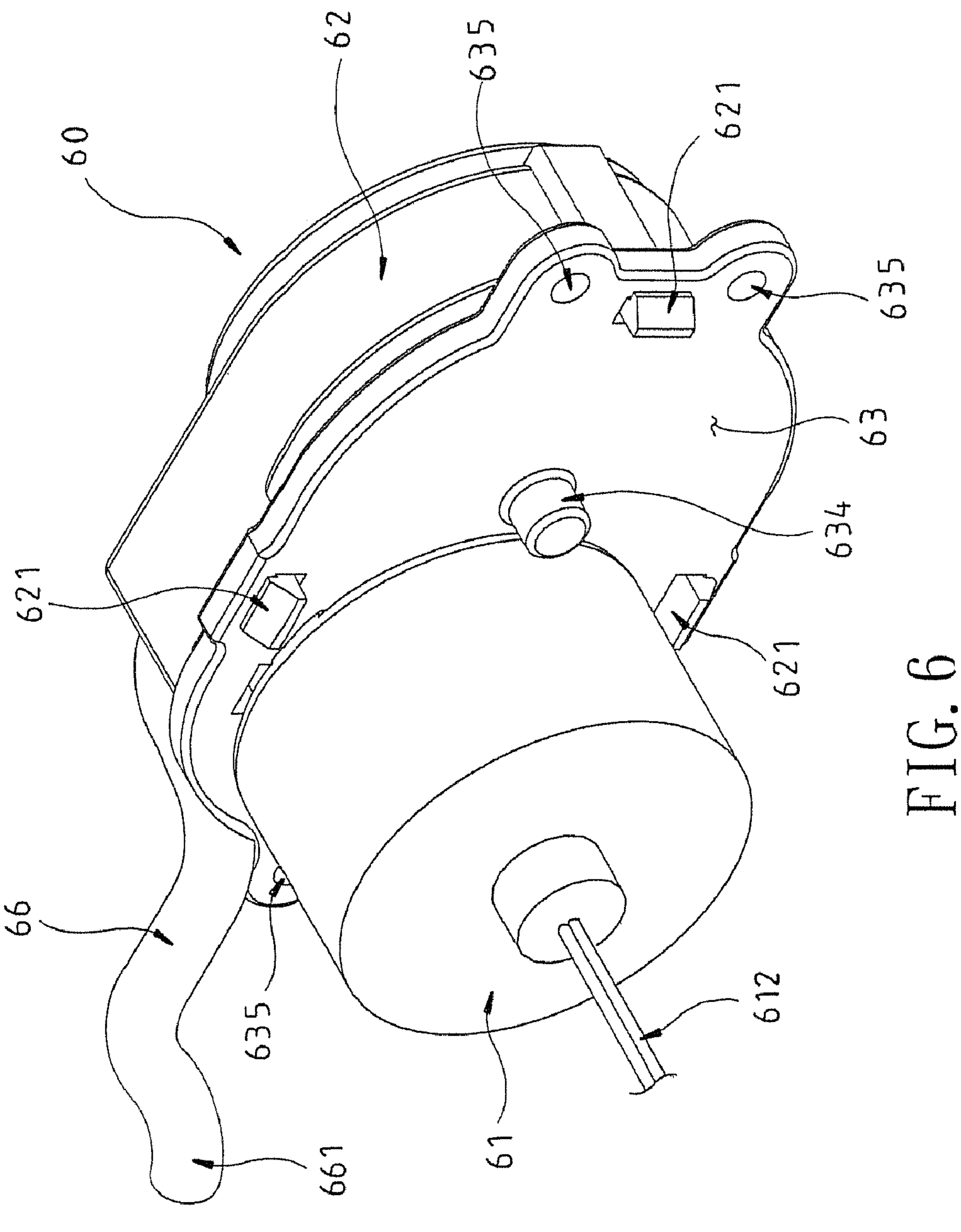
FIG. 6 is a perspective view of a liquid suction device (60) of the present invention.
Figure 7:
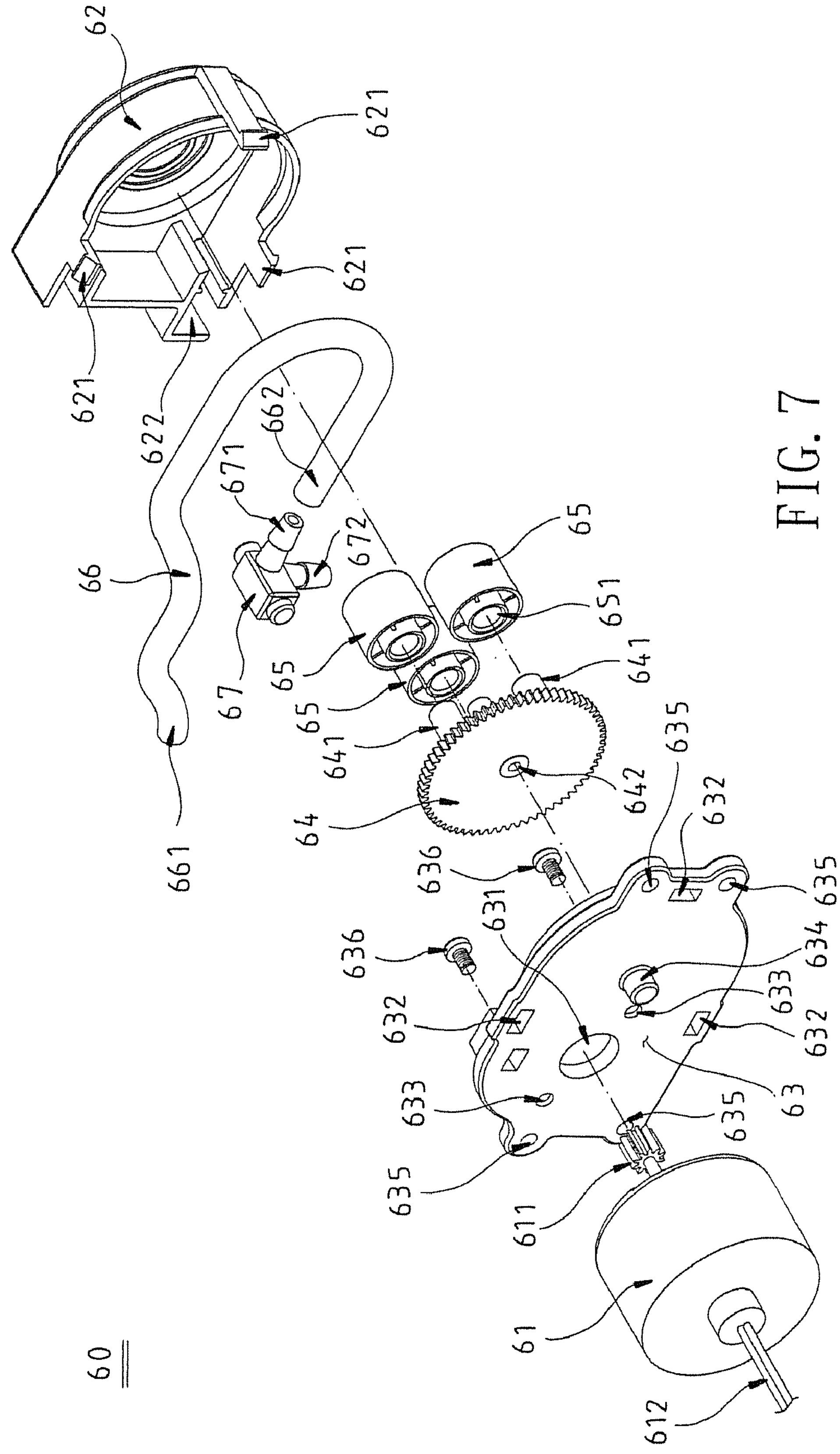
FIG. 7 is an exploded view of a liquid suction device (60) of the present invention.
Figure 8:
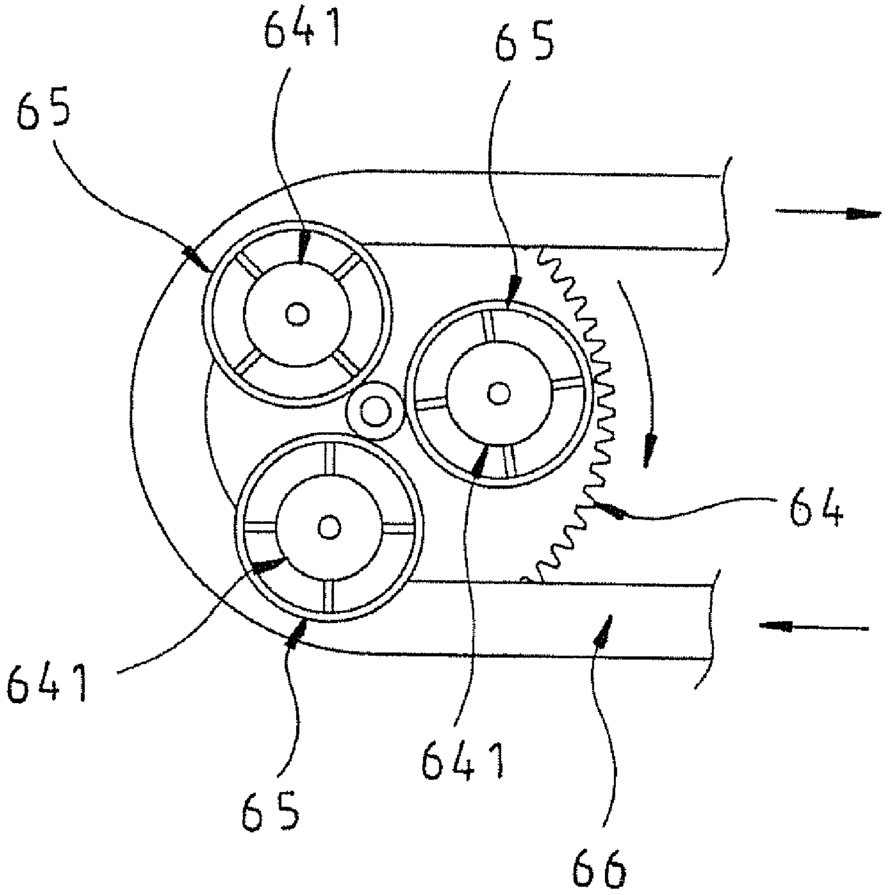
FIG. 8 is a schematic view of sucking a liquid in accordance with the present invention.

With reference to FIGS. 6 and 7 for the liquid suction device (60), the liquid suction device (60) comprises a motor (61), a casing cover (62), a support plate (63), a large gear (64), three wheels (65), a hose (66) and an adapter (67).

The motor (61) includes a drive gear (611) coupled to a front end of the transmission shaft, and electrically coupled to the control circuit device (50) through a cable (612).

The casing cover (62) is substantially a hollow-frame casing and includes three latch hooks (621) formed at the external periphery of the casing cover (62), and a containing groove (622) formed at the bottom of a front end in the casing cover (62).

The support plate (63) has a circular hole (631) formed at the center of the support plate (63), three rectangular latch hole grooves (632) formed at the external periphery of the support plate (63) and disposed at positions corresponding to the latch hook (621) of the casing cover (62), a screw hole (633) formed on both sides of the circular hole (631) separately, a protruding shaft (634) protruded from the center of the support plate (63), and four screw holes (635) formed at corners on both sides of the support plate (63) respectively.

The large gear (64) includes three protruding shafts (641) protruded outwardly from a side of the large gear (64), a positioning shaft hole (642) formed at the center of the large gear (64) and axially passed and coupled to the protruding shaft (634) at the center of the support plate (63) through the positioning shaft hole (642). The motor (61) includes a drive gear (611) installed on a side of the motor (61) and passed through the circular hole (631) at the center of the support plate (63), and two screws (636) are passed through the screw holes (633) on both sides of the circular hole (631) of the support plate (63) respectively to secure the motor (61), so that the drive gear (611) and the large gear (64) are engaged with each other.

Three wheels (65) are passed through the shaft hole (651) at the center and axially coupled to three protruding shafts (641) on a side of the large gear (64) to drive the wheels (65) to rotate freely.

The hose (66) is a hollow soft flexible tube, having an end as a spray end (661), and the other end as a suction end (662).

The adapter (67) has a protruding tube (671) installed in a horizontal direction and a protruding tube (672) installed in a vertical direction, and the horizontal protruding tube (671) is sheathed on and fixed to the suction end (662) of the hose (66), and the hose (66) is wound around the external periphery of the three wheels (65), and the adapter (67) is latched and fixed into the containing groove (622) at the bottom of a front end inside the casing cover (62), and the casing cover (62) is latched and fixed into the three rectangular latch hole grooves (632) of the support plate (63) through three latch hooks (621), so as to assemble a whole liquid suction device (60).

The liquid suction device (60) is passed and installed into the four screw holes (635) at the four corners of the support plate (63) by four screws (69) and secured to the four screw holes (37) on the internal side of the top of the left casing (30), and the hose (66) is sheathed on a positioning wheel (68), and the positioning wheel (68) is disposed across semicircular arc groove hole (36) inside the top edge of the left casing (30), and the spray end (661) of the hose (66) is sheathed and fixed to the protruding tube (43) at the rear end of the spray head (42).

The latch board (73) includes a protruding tube (74) installed at the center of an upper end of the latch board (73), and another protruding tube (75) installed at the center of a lower end of the latch board (73), and the latch board (73) is inserted and fixed into the slender latch groove (83) at the bottom edge of the left casing (30), and the protruding tube (74) is coupled at a position proximate to the semicircular hole (82) and protruded upwardly.

The transmission tube (70) has an upper opening (71) formed at an end of the transmission tube (70) and sheathed on an adapter (67) inside the liquid suction device (60) and the protruding tube (672) is downwardly bent, and a lower opening (72) formed at another end of the transmission tube (70) is sheathed on the protruding tube (74) at the upper end of the latch board (73).

The right casing (20) is secured into four screw holes (33) corresponding to left casing (30) by passing four screws (24) into the four screw holes (23) of the right casing (20) respectively. The battery cover (56) is covered onto a rear side of the right casing (20) and the left casing (30), and a screw (57) is passed and secured into the screw hole (39) formed at a lower edge of a rear side of the left casing (30), so as to assemble a whole electric sprayer (11).

The liquid container (12) includes the transmission tube (15) installed at the center of the liquid container (12) and sheathed onto the protruding tube (75) at the lower end of the latch board (73) at the bottom of the electric sprayer (11), and a latch plate (14) is installed on both sides of the top end of the liquid container (12) separately and upwardly contained in a latch groove (84) formed at the bottom of the left casing (30) of the electric sprayer (11), and the liquid container (12) is turned, latched and fixed to assemble a whole handheld sprayer (10).

While the invention has been described by means of specific embodiments, numerous modifications and variations could be made thereto by those skilled in the art without departing from the scope and spirit of the invention set forth in the claims.

In summation of the description above, the present invention definitely achieves the expected effects, improves over the prior art, and complies with patent application requirements, and thus is duly filed for patent application.

What is claimed is:

1. An improved handheld sprayer structure, comprising: an electric sprayer and a liquid container, characterized in that:

the liquid container is a hollow bottle having a cap installed at a front side of the top of the liquid container, and the cap can be opened for filling or refilling a liquid, and a latch plate is protruded from both sides of the top of the liquid container separately, and a transmission tube is passed through the center of the liquid container, and an end of the transmission tube is extended into the bottom inside the liquid container, and the other end of the transmission tube is extended to an appropriate length out from the top of the liquid container;

the electric sprayer comprises: a right casing, a left casing, a sleeve, a spray head, a press button, a press element, a control circuit device, a battery module, a liquid suction device, a transmission tube, a latch board and a battery cover, wherein:

the right casing right casing is a hollow-frame casing having a latch groove formed at a front end of the top of the right casing, a rectangular groove hole formed at a front end of the middle section of the right casing, and a plurality of screw holes formed on an external frame of the right casing;

the left casing is a hollow-frame casing comprising a latch groove formed at a front end of the top of the left casing, a rectangular groove hole formed at a front end of the middle section of the left casing, a plurality of screw holes formed in the left casing, a semicircular hole concavely formed at an upper edge of the rectangular groove hole, a protruding shaft transversally protruded from an internal edge of the semicircular hole, and a semicircular arc groove hole concavely formed inside the top edge of the left casing, and the left casing further comprises four screw holes and a slender latch groove formed on an internal side of the top of the left casing, a screw hole formed at a lower edge of a rear side of the left casing, a containing space formed at the center of a rear side of the left casing, a semicircular hole formed at the center of the bottom edge of the left casing, a slender latch groove formed at a lower edge of the semicircular hole, and a latch groove formed at a position parallel to the bottom of the latch groove;

the sleeve is a hollow conical casing having a convex latch plate installed at the rear, and the sleeve is installed into latch groove at the front end of the top of the left casing by the convex latch plate;

the spray head is a hollow cylindrical shape having a protruding tube installed at the rear, and the spray head is passed through the center of the sleeve and a front end of the spray head is protruded to an appropriate length out from the sleeve;

the press button is a hollow case made of a soft plastic material, and a latch flange disposed around the periphery at the rear and into the rectangular groove hole formed at the front end of the middle section of the left casing;

the press element includes a shaft hole transversally formed at an upper end of a middle section of the press element and provided for installing into the protruding shaft of the left casing, such that the press element is axially coupled to the protruding shaft in the left casing;

the control circuit device is substantially in the shape of a plate and has an LED lamp electrically coupled to a front end of the control circuit device, and the control circuit device includes a start switch installed at the bottom of the front end of the control circuit device and a connecting element installed at the top of a rear end of the control circuit device and coupled for inputting an external power supply, and the control circuit device is electrically coupled to a battery module through a cable, and the control circuit device is inserted and fixed into a slender latch groove on an internal side at the top of the left casing, and an LED lamp is contained in a semicircular hole of the left casing, and the battery module is installed in a containing space at the center of a rear side of the left casing;

the liquid suction device comprises a motor, a casing cover, a support plate, a large gear, three wheels, a hose and an adapter, wherein:

the motor includes a drive gear coupled to a front end of the transmission shaft, and electrically coupled to the control circuit device through a cable;

the casing cover is substantially a hollow-frame casing and includes three latch hooks formed at the external periphery of the casing cover, and a containing groove formed at the bottom of a front end in the casing cover;

the support plate has a circular hole formed at the center of the support plate, three rectangular latch hole grooves formed at the external periphery of the support plate and disposed at positions corresponding to the latch hook of the casing cover, a screw hole formed on both sides of the circular hole separately, a protruding shaft protruded from the center of the support plate, and four screw holes formed at corners on both sides of the support plate respectively;

the large gear includes three protruding shafts protruded outwardly from a side of the large gear, a positioning shaft hole formed at the center of the large gear and axially passed and coupled to the protruding shaft at the center of the support plate through the positioning shaft hole, and the motor includes a drive gear installed on a side of the motor and passed through the circular hole at the center of the support plate, and two screws are passed through the screw holes on both sides of the circular hole of the support plate respectively to secure the motor, so that the drive gear and the large gear are engaged with each other;

the three wheels are passed through the shaft hole at the center and axially coupled to three protruding shafts on a side of the large gear to drive the wheels to rotate freely;

the hose is a hollow soft flexible tube, having an end as a spray end, and the other end as a suction end;

the adapter has a protruding tube installed in a horizontal direction and a protruding tube installed in a vertical direction, and the horizontal protruding tube is sheathed on and fixed to the suction end of the hose, and the hose is wound around the external periphery of the three wheels, and the adapter is latched and fixed into the containing groove at the bottom of a front end inside the casing cover, and the casing cover is latched and fixed into the three rectangular latch hole grooves of the support plate through three latch hooks, so as to assemble a whole liquid suction device;

the liquid suction device is passed and installed into the four screw holes at the four corners of the support plate by four screws and secured to the four screw holes on the internal side of the top of the left casing, and the hose is sheathed on a positioning wheel, and the positioning wheel is disposed across semicircular arc groove hole inside the top edge of the left casing, and the spray end of the hose is sheathed and fixed to the protruding tube at the rear end of the spray head;

the latch board includes a protruding tube installed at the center of an upper end of the latch board, and another protruding tube installed at the center of a lower end of the latch board, and the latch board is inserted and fixed into the slender latch groove at the bottom edge of the left casing, and the protruding tube is coupled at a position proximate to the semicircular hole and protruded upwardly;

the transmission tube has an upper opening formed at an end of the transmission tube and sheathed on an adapter inside the liquid suction device and the protruding tube is downwardly bent, and a lower opening formed at another end of the transmission tube is sheathed on the protruding tube at the upper end of the latch board;

the right casing is secured into four screw holes corresponding to left casing by passing four screws into the four screw holes of the right casing respectively, and the battery cover is covered onto a rear side of the right casing and the left casing, and a screw is passed and secured into the screw hole formed at a lower edge of a rear side of the left casing, so as to assemble a whole electric sprayer; and the liquid container includes the transmission tube installed at the center of the liquid container and sheathed onto the protruding tube at the lower end of the latch board at the bottom of the electric sprayer, and a latch plate is installed on both sides of the top end of the liquid container separately and upwardly contained in a latch groove formed at the bottom of the left casing of the electric sprayer, and the liquid container is turned, latched and fixed to assemble a whole handheld sprayer.

* * * * *